United States Patent [19]

Prumbaum et al.

[11] Patent Number: 4,722,427
[45] Date of Patent: Feb. 2, 1988

[54] PARKING LOCK FOR AUTOMATIC GEARBOXES OF MOTOR VEHICLES

[75] Inventors: Günter Prumbaum, Eitdorf; Walter Lauven, Nörvenich; Kurt Graef, Pulheim, all of Fed. Rep. of Germany

[73] Assignee: Ford Motor Company, Dearborn, Mich.

[21] Appl. No.: 915,832

[22] Filed: Oct. 6, 1986

[30] Foreign Application Priority Data

Oct. 18, 1985 [DE] Fed. Rep. of Germany ....... 3537091

[51] Int. Cl.⁴ .................. B60T 11/04; F16D 49/00
[52] U.S. Cl. ..................... 192/4 A; 188/31
[58] Field of Search .............. 192/4 A, 4 R, 111 A; 188/31, 69, 72.7; 74/411.5, 470, 582, 104, 107

[56] References Cited

U.S. PATENT DOCUMENTS 4,645,046 2/1987 Takano et al. .................. 188/31 X

FOREIGN PATENT DOCUMENTS 2936466 3/1980 Fed. Rep. of Germany .
3220260 12/1982 Fed. Rep. of Germany .
33432 3/1979 Japan .................................. 192/4 A Primary Examiner—Rodney H. Bonck
Assistant Examiner—David A. Testardi
Attorney, Agent, or Firm—Donald J. Harrington; Keith L. Zerschling

[57] ABSTRACT

A parking lock for an automatic transmission for motor vehicles, having a parking gearwheel mounted rotationally and rigidly on the output shaft of the transmission, includes a pivotable parking pawl adapted to engage the parking gearwheel, and actuating rod with a sliding sleeve (5) displaceable relative to the actuating rod against the force of an engagement spring, the parking pawl being adapted to be moved by the sleeve into an operative position, the actuating rod (8) being shaped by upsetting to form a thickened piston portion (11) which is received in the sleeve.

1 Claim, 3 Drawing Figures

PARKING LOCK FOR AUTOMATIC GEARBOXES OF MOTOR VEHICLES

BACKGROUND OF THE INVENTION

The present invention relates to a parking lock or brake for automatic transmissions for motor vehicles of the type described in German patent specification No. 29 36 466.

In the design of the parking lock of the German specification a sliding sleeve displaceable with respect to an actuating rod against the force of a spring is provided with a conical shoulder. A spring plate is secured to the actuating rod by approprite means in order to support the spring.

Another parking lock for automatic transmissions for motor vehicles is shown in German patent specification No. 32 20 260. In that design a spring acting upon the sliding sleeve is disposed inside the sliding sleeve (see FIG. 8) between one shoulder of the actuating rod and a circlip.

The use of a spring in combination with a spring support or with circlip grooves and circlips on the actuating rod is expensive to manufacture. Secondly, in the case of the circlip groove the cross-section of the actuating rod is reduced. Thus the diameter of the entire rod is made larger than the diameter that would be chosen if the circlip groove were not present.

BRIEF DESCRIPTION OF THE INVENTION

The object of the invention is to provide a parking lock design for automatic transmissions for motor vehicles that will permit simpler manufacturing operations with less cost.

The actuating rod is connected at one end to a manual selector lever. Its other end is shaped by upsetting to form a thickened piston portion which is received and guided in a cylinder portion in a sliding sleeve formed as an integral extruded part of a rod extension, which serves as a guide. A parking lock engagement spring is disposed inside the sliding sleeve between the base of the cylinder portion and the end of the piston portion. The edge of the cylinder portion, which overlaps the piston poriton, is provided with an internal flange. Our improved parking lock thus comprises a minimum number of components and oversize dimensions of the actuating rod are unnecessary.

In addition, by an appropriate selection of the size of an orifice in the bore connecting the closed cylinder portion with the atmosphere and by appropriate disposition of two engagement springs, a yielding spring characteristic and a shock-absorbing damping effect are achieved as the sliding sleeve is moved to a parking lock engagement posotion.

DESCRIPTION OF THE FIGURES OF THE DRAWINGS

The invention is described in greater detail with reference to an embodiment illustrated in the accompanying drawing, in which.

PARTICULAR DESCRIPTION OF THE INVENTION

Figure 1:
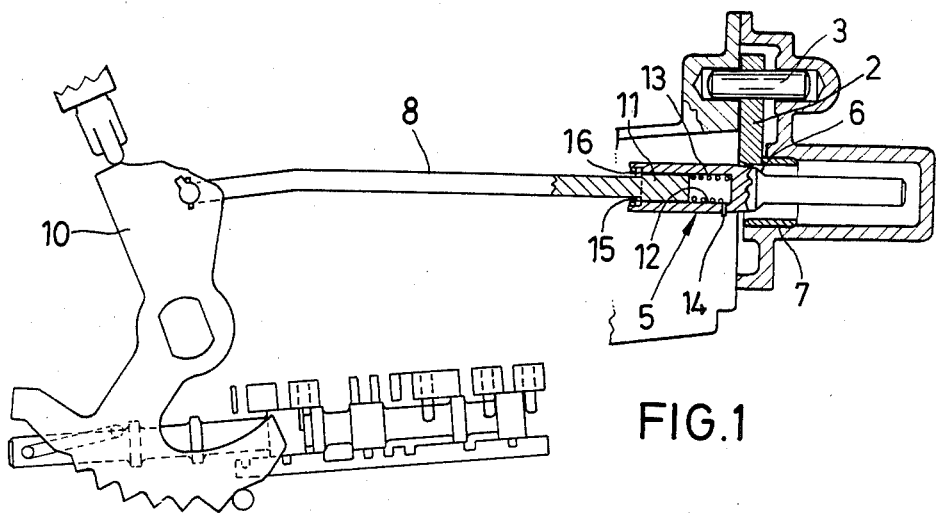
FIG. 1 is a side view of a parking lock for an automatic transmission with the actuating rod and sliding sleeve connection according to the invention.
Figure 2:
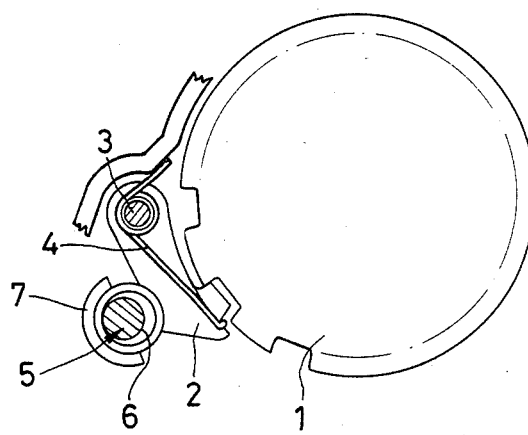
FIG. 2 is a partial view of a parking pawl displaceable by the sliding sleeve with a conical shoulder and the associated parking gearwheel.
Figure 3:
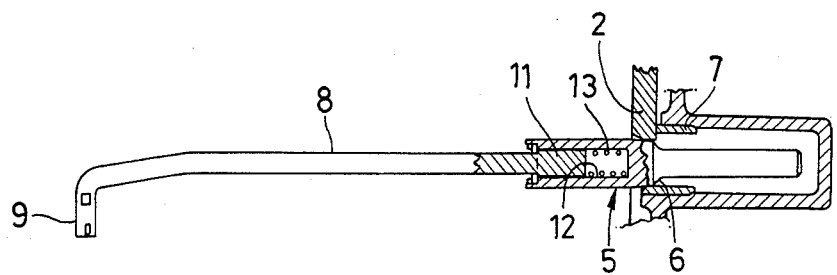
FIG. 3 is a plan view of the actuating rod and sliding sleeve connection of FIG. 1.

The parkiing lock for an automatic gearbox for motor vehicles, as illustrated in FIGS. 1 to 3, essentially comprises a parking gearwheel 1 which is disposed rotationally and rigidly on the transmission torque output shaft (not shown). A pivotable parking pawl 2, which is pivotable about a pivot pin 3, is disposed at the side of the parking gearwheel 1 and is normally held by a return spring 4 disengaged from the parking gearwheel 1. In this connection the parking pawl 2 is pressed into engagement with the parking gearwheel 1 by a sliding sleeve 5 with a conical shoulder 6 as the sliding sleeve 5 is moved toward parking pawl 2. The sleeve is supported on a guide 7 which is disposed in part of the transmission casing.

The sliding sleeve 5 with the conical shoulder 6 can be actuated by way of an actuating rod 8, one angled end 9 of which is connected to a lever 10 which is operatively connected to a manual selector lever of the automatic transmission, by means of which the different operating ranges of the automatic transmission can be selected.

When the mechanism is in the condition shown in FIGS. 1 and 3, the pawl 2 is in the parked mode shown in FIG. 2. The conical shoulder at this time is at or beyond the plane of the pawl.

The actuating rod 8 is shaped by upsetting at its other end remote from its angled end 9 to form a thickened piston portion 11 which is received in a corresponding cylinder portion 12 of the sliding sleeve 5, the latter being formed as an integral extrusion and forging. The engagement spring 13 is formed as a helical compression spring and at least one spring reaction shoulder of the sliding sleeve 5 is disposed in the interior of the cylinder portion 12. The interior of the cylinder portion 12 is connected to the atmosphere by way of a small bore or orifice 14 in order to allow the piston portion 11 to move inside the cylinder portion 12. The edge 15 of the cylinder portion 12 of the sliding sleeve 5 projects beyond the piston portion 11 on one side is flanged over or rolled over to provide a seat for a spacer ring 16, as a result of which a simple connection is made that is simple to manufacture and reliable in operation is produced between the actuating rod 8 and the sliding sleeve 5. In addition the connection does not require overside dimensions of the actuating rod.

If the lever 10, which is connected to the manual selector lever of the automatic gearbox, is moved into the parking position, the actuating rod 8 is moved to the right as viewed in FIG. 1, directly displacing the sliding sleeve 5. If the parking pawl 2 with its locking tooth then engages a locking groove on the parking gearwheel, the resulting parking lock is effective.

If the actuating rod is moved to the right as viewed in FIG. 1 and if the parking pawl 2 does not engage on a locking groove, the sliding sleeve 5 is prevented from moving axially by the guide 7 cooperating therewith, but the movement of the actuating rod is made possible because of displacement of the piston portion 11 in the cylinder portion 12 of the sliding sleeve. The engagement spring 13 then is prestressed. As soon as there is a rotation of the parking gearwheel caused by a slight turning of the transmission output shaft, the locking tooth of the parking pawl 2 can engage a locking groove of the parking gearwheel. This is directly caused by the action of the conical shoulder 6 in conjunction with the prestressed engagement spring 13. The narrow bore or orifice 14 in the cylinder portion 12 ensures that when the engagement spring 13 is prestressed, air can escape from the cylinder portion 12.

When the locking tooth of the parking pawl 2 engages in a locking groove of the parking gearwheel 1, the sliding sleeve 5 tends to be displaced by the prestressed engagement spring 13 relatively rapidly, as a result of which a undesired crashing noise can occur. This undesired movement can be damped, however, by suitably dimensioning the bore or orifice 14.

We claim:

1. An automatic transmission parking brake comprising:
   a parking gearwheel adapted to be fixed to a power output shaft of the transmission;
   an actuating rod, an actuator sleeve defining a cylinder located at one end of said actuating rod;
   a compression spring in said cylinder between said rod and said actuator sleeve adapted to resist relative movement between them;
   said one rod end defining a piston movable within said cylinder, and said sleeve further defining a tapered shoulder;
   a pawl mounted for oscillatory movement about a fixed pivot axis into and out of engagement with said gearwheel, said shoulder engaging said pawl to actuate the latter when said actuator rod is moved toward said gearwheel;
   said cylinder being formed with a pneumatic fluid flow orifice between the interior of said cylinder and the atmosphere whereby relative movement of said sleeve relative to said actuator rod is cushioned.

* * * * *